United States Patent
Mitsumoto

(10) Patent No.: US 6,940,244 B2
(45) Date of Patent: Sep. 6, 2005

(54) WIPER CONTROL APPARATUS AND WIPER CONTROL METHOD

(75) Inventor: Yoshihiro Mitsumoto, Yokohama (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 10/765,104

(22) Filed: Jan. 28, 2004

(65) Prior Publication Data

US 2004/0183492 A1 Sep. 23, 2004

(30) Foreign Application Priority Data

Feb. 14, 2003 (JP) ........................................ 2003-036776

(51) Int. Cl.[7] .............................................. H02P 1/04
(52) U.S. Cl. ...................... 318/443; 318/444; 318/445
(58) Field of Search ........................... 318/443, DIG. 2, 318/444, 445, 481, 483, 484; 701/51; 15/250.13, 250.16

(56) References Cited

U.S. PATENT DOCUMENTS

| 5,333,351 A | * | 8/1994 | Sato | .................. | 15/250.13 |
| 5,504,406 A | | 4/1996 | Shultz et al. | | |
| 6,072,295 A | | 6/2000 | Kusunoki | | |
| 6,085,137 A | * | 7/2000 | Aruga et al. | .................. | 701/51 |

FOREIGN PATENT DOCUMENTS

| DE | 39 22 230 A1 | 1/1991 |
| DE | 101 18 173 A1 | 10/2002 |
| JP | 5-319213 | 12/1993 |
| WO | WO 96/08395 | 3/1996 |
| WO | WO 99/32335 | 7/1999 |

* cited by examiner

Primary Examiner—Karen Masih
(74) Attorney, Agent, or Firm—McDermott Will & Emery LLP

(57) ABSTRACT

An apparatus, which engages wiper blades in operation by interlocking with an operation of a washer switch, drives the wiper blades at a high speed if the vehicle speed during the wiper blade operation is equal to or higher than a predetermined value. As a result, the washer fluid sprayed onto the windshield can be wiped away immediately when the vehicle is traveling at a high speed.

6 Claims, 3 Drawing Sheets

WIPER CONTROL APPARATUS AND WIPER CONTROL METHOD

BACKGROUND OF THE INVENTION

1. Field of the Invention

The present invention relates to a wiper control apparatus that drives wipers when a washer switch is operated and a wiper control method.

2. Description of the Related Art

There is a wiper control apparatus known in the related art that drives the wipers by interlocking with a washer switch operation performed by the driver and adjusts the length of time to elapse after the washer switch is turned on until the wiper drive starts in correspondence to the vehicle speed (see Japanese Laid Open Patent Publication No. H 5-319213). This apparatus in the related art reduces the length of time to elapse after the washer switch is turned on until the wiper drive starts as the vehicle speed increases. As a result, the washer fluid sprayed onto the windshield is not spread over a large area of the windshield surface by the wind pressure.

SUMMARY OF THE INVENTION

However, since the apparatus in the related art drives the wipers at a constant speed even when the vehicle is traveling at a high speed, the washer fluid sprayed onto the windshield surface of a vehicle traveling fast is not wiped immediately.

The present invention provides a wiper control apparatus and a wiper control method, which make it possible to immediately wipe a washing solution sprayed onto the windshield surface when the vehicle is traveling at a high speed.

The wiper control apparatus according to the present invention comprises a wiper drive device capable of driving wiper blades used to wipe a glass surface at one of a low speed and a high-speed, a vehicle speed detection device that detects the vehicle speed and a judging device that judges as to whether or not the vehicle speed is equal to or higher than a predetermined speed. The wiper drive device engages the wiper blades in a high-speed operation when a washer switch is manually turned on and the judging device determines that the vehicle speed is equal to or higher than the predetermined speed.

In the wiper control method according to the present invention, wiper blades are engaged in a high-speed operation when a washer switch is manually turned on and the vehicle speed is equal to or higher than a predetermined speed.

DETAILED DESCRIPTION OF THE PREFERRED EMBODIMENTS

First Embodiment

Figure 1:
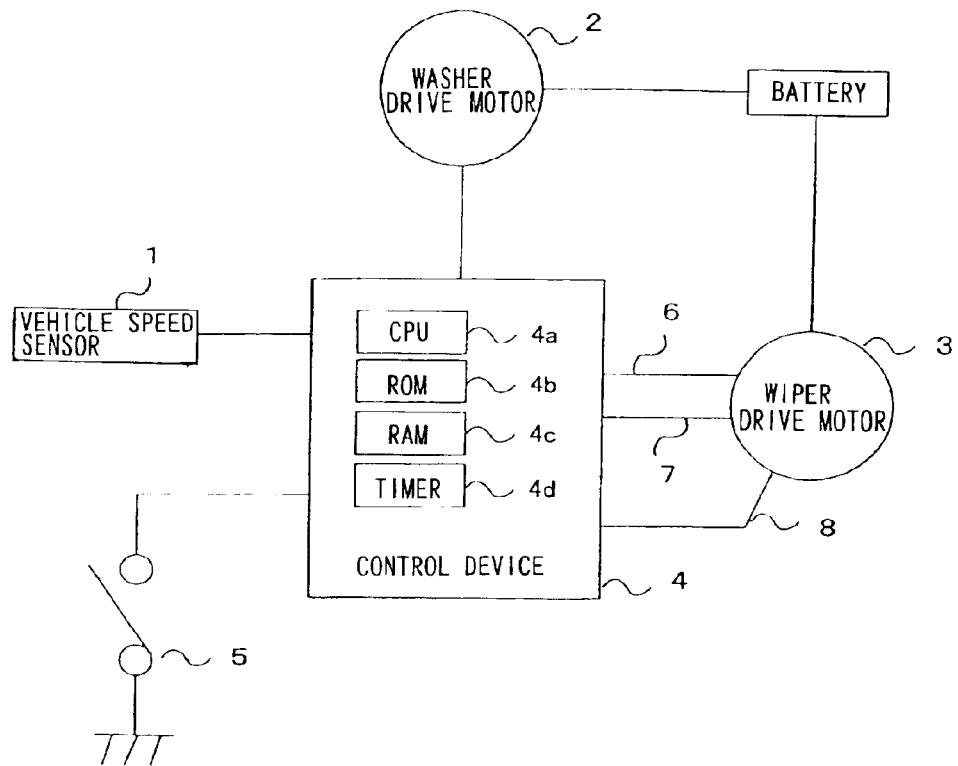
FIG. 1 shows the structure adopted in a wiper control apparatus achieved in a first embodiment of the present invention.

FIG. 1 shows the structure of the wiper control apparatus for vehicle achieved in the first embodiment of the present invention. The wiper control apparatus in the first embodiment includes a speed sensor 1, a washer drive motor 2, a wiper drive motor 3, a control device 4 and a washer switch 5. The following is an explanation of a method of front wiper control achieved by employing the wiper control apparatus in the first embodiment.

The speed sensor 1 detects the speed at which the vehicle is traveling. The detected vehicle speed is input to the control device 4 which is to be detailed later. The washer switch 5 is a switch used to spray a washer fluid onto the windshield of the vehicle. As the washer switch 5 is turned on by the driver, the washer drive motor 2 is driven to spray the washer fluid onto the windshield surface.

The wiper drive motor 3 engages wiper blades (not shown) used to wipe away raindrops or the washer fluid settled on the windshield with a reciprocal motion over the glass surface. Control lines 6, 7 and 8 are connected between the wiper drive motor 3 and the control device 4. A signal for causing the wiper drive motor 3 to rotate at a high speed is transmitted to the wiper drive motor 3 through the control line 6. A signal for causing the wiper drive motor 3 to rotate at a low speed is transmitted to the wiper drive motor 3 through the control line 7. A stop position signal indicating whether or not the wiper blades are stopped at a specific stop position at the bottom end of the windshield is transmitted through the control line 8. This stop position signal is output from the wiper drive motor 3 and input to the control device 4.

The control device 4 includes a CPU 4a, a ROM 4b, a RAM 4c and a timer 4d. The washer drive motor 2 is connected to a battery 10 and is also connected to the control device 4. As the driver turns on the washer switch 5, the control device 4 grounds the line connecting itself to the washer drive motor 2 by controlling an internal relay (not shown). In response, power is supplied from the battery 10 to the washer drive motor 2 and the washer fluid is sprayed onto the windshield surface.

As the washer drive motor 2 starts to rotate, the control device 4 starts the timer 4d. After the washer fluid is sprayed onto the windshield, the control device 4 drives the wiper drive motor 3 in order to wipe away the washer fluid on the glass surface. At this time, the wiper drive motor 3 is not allowed to start operating until the timer 4d having been activated counts a predetermined length of time to ensure that no scarring occurs at the glass surface. Namely, since washer fluid is not yet present on the windshield (the glass is dry), any movement of the wiper blades is disallowed immediately after the washer drive motor 2 is started.

The wiper drive motor 3, too, is connected to the battery 10 and to the control device 4. The wiper drive motor 3 is driven in a method similar to that with which the washer drive motor 2 is driven. Namely, the control device 4 grounds the line connecting itself to the wiper drive motor 3 by controlling an internal relay (not shown). In response, power is supplied to the wiper drive motor 3 and the wiper drive motor 3 is driven.

Figure 2:
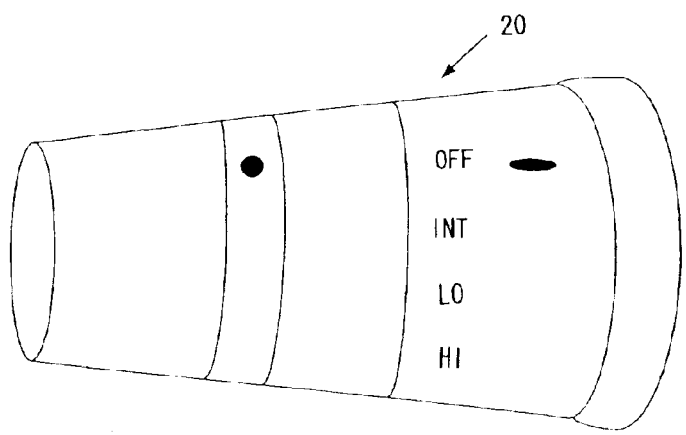
FIG. 2 presents an example of a wiper switch.

FIG. 2 presents an example of a wiper switch 20 installed in the vehicle. The rotating speed of the wiper drive motor 3 is adjusted in correspondence to the operating position set at the wiper switch 20. When the wiper switch 20 is set at a HI position (see FIG. 2), the wiper drive motor 3 rotates at a high speed, whereas when the wiper switch 20 is set at a LO position, the wiper drive motor 3 rotates at a low speed. The high-speed rotation of the wiper drive motor 3 causes the wiper blades (not shown) to move at a high speed, whereas the low speed rotation of the wiper drive motor 3 causes the wiper blades to move at a low speed. In other words, the wiper blades can be caused to move at either of the two speed levels, i.e., at a high speed or a low speed.

It is to be noted that when the wiper switch 20 is set at an INT position, the wiper blades are engaged in intermittent operation.

In the wiper control apparatus achieved in the first embodiment, the drive speed of the wiper drive motor 3 is adjusted in correspondence to the vehicle speed when driving the wiper drive motor 3 by interlocking with an operation (an ON operation) of the washer switch 5 performed by the driver. Namely, if the vehicle speed detected by the speed sensor 1 is lower than a predetermined speed, the wiper drive motor 3 is engaged in a low-speed operation, whereas if the detected vehicle speed is equal to or higher than the predetermined speed, the wiper drive motor 3 is engaged in a high-speed operation. The predetermined speed is set at 80 km/h in this example.

Figure 3:
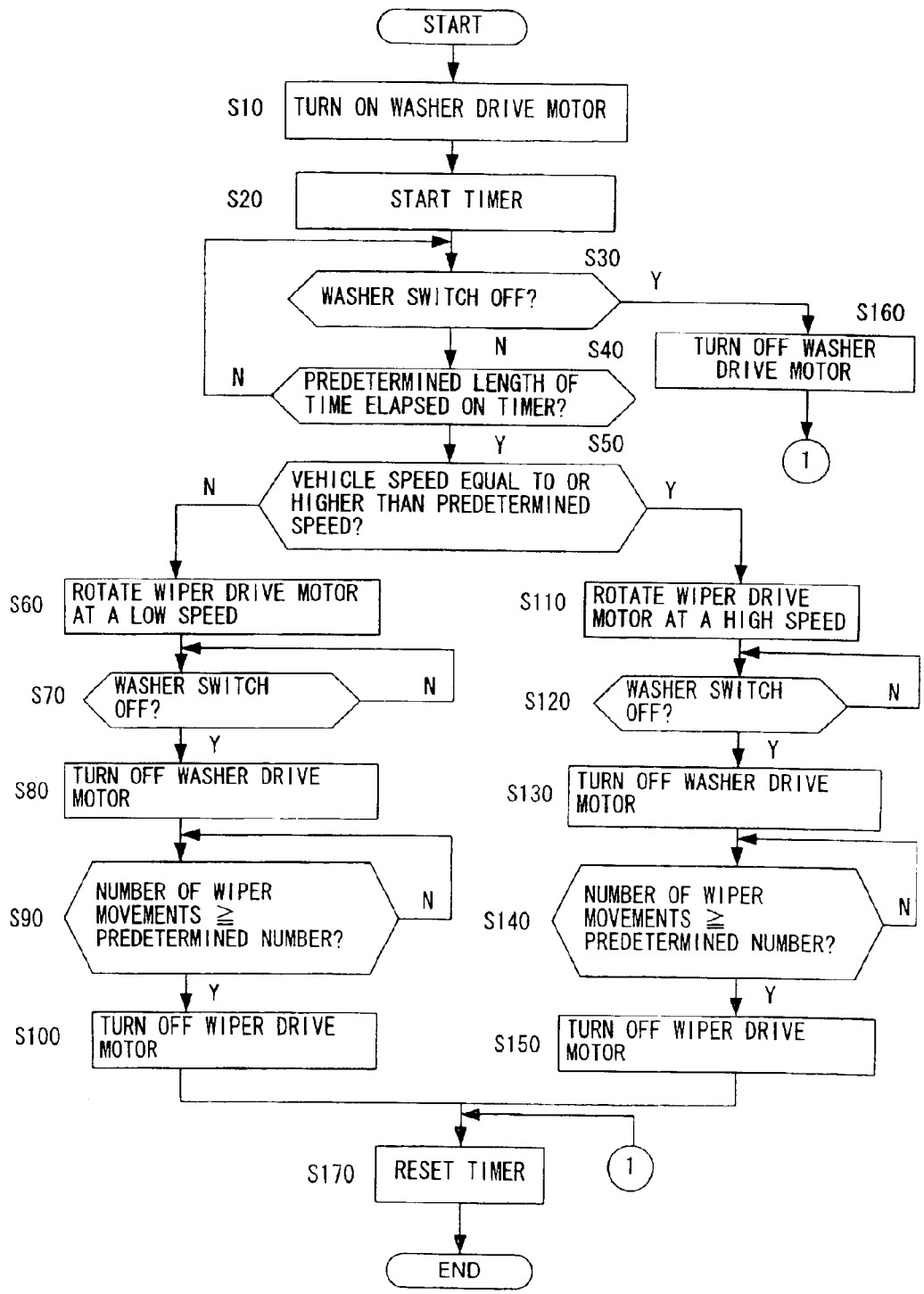
FIG. 3 presents a flowchart of the wiper control executed by the wiper control apparatus in the first embodiment.

FIG. 3 presents a flowchart of the wiper control executed by the wiper control apparatus in the first embodiment. The processing in step S10 starts in response to an ON operation of the washer switch 5 performed by the driver. The processing which starts in step S10 is executed by the control device 4.

Instep S10, the washer drive motor 2 is started to drive and then the operation proceeds to step S20. In step S20, the timer 4*d* is started before the operation proceeds to step S30. In step S30, a decision is made as to whether or not the washer switch 5 has been turned off. If it is decided that the washer switch 5 is sustained in an ON state, the operation proceeds to step S40, whereas if it is decided that the washer switch 5 has been turned off, the operation proceeds to step S160. In step S160, since the washer switch 5 has been turned off before driving the wiper drive motor 3, the washer drive motor 2 is stopped and then the operation proceeds to step S170.

In step S40, a decision is made as to whether or not the timer 4*d* having been started in step S20 has counted a predetermined length of time. The predetermined length of time is set to 0.5 sec in this example. The operation returns to step S30 if it is decided that the predetermined length of time has not yet elapsed on the timer 4*d*, whereas the operation proceeds to step S50 if it is decided that the predetermined length of time has elapsed.

In step S50, a decision is made as to whether or not the vehicle speed detected by the speed sensor 1 is equal to or higher than the predetermined speed (80 km/h). The operation proceeds to step S110 if it is decided that the vehicle speed is equal to or higher than the predetermined speed, whereas the operation proceeds to step S60 if the vehicle speed is determined to be lower than the predetermined speed.

In step S60, the wiper drive motor 3 is activated to rotate at a low speed. In response, the wiper blades (not shown) start to move at a low speed to wipe away the washer fluid having been sprayed onto the windshield. After the wiper drive motor 3 is activated to rotate at a low speed, the operation proceeds to step S70.

In step S70, a decision is made as to whether or not the washer switch 5 has been turned off by the driver. If it is decided that the washer switch 5 is sustained in an ON state, the wiper drive motor 3 is continuously driven to rotate at a low speed. If, on the other hand, it is decided that the washer switch 5 has been turned off, the operation proceeds to step S80. In step S80, the washer drive motor 2 is stopped before the operation proceeds to step S90.

In step S90, a decision is made as to whether or not the wiper blades (not shown) have moved a predetermined number of times after the washer drive motor 2 was stopped. Namely, the wiper blades are made to move the predetermined number of times after the washer fluid spray ends so as to wipe away the washer fluid settled on the windshield. In this example, the predetermined number of times that the wiper blades are made to move is set to 3.

It is to be noted that when the wiper blades move once, they make two strokes as a reciprocal action. If it is decided that the wiper blades have not yet moved three times, i.e., the predetermined number of times, after the washer drive motor 2 was stopped, the wiper blades are made to continue moving until they have moved three times. If, on the other hand, it is decided that the wiper blades have moved three times, i.e., the predetermined number of times, after the washer drive motor 2 was stopped, the operation proceeds to step S100.

In step S100, the wiper drive motor 3 is stopped based upon the stop position signal output from the wiper drive motor 3. Namely, the control device 4 stops the wiper drive motor 3 if it is verified based upon the stop position signal that the wiper blades have been reset to the predetermined stop position. Once the wiper drive motor 3 is stopped, the operation proceeds to step S170.

In step S110, to which the operation proceeds after deciding in step S50 that the vehicle speed is equal to or higher than the predetermined speed, the wiper drive motor 3 is activated to rotate at a high speed. In response, the wiper blades (not shown) engage in a high-speed operation to wipe away the washer fluid having been sprayed onto the windshield. After the wiper drive motor 3 is activated to rotate at a high speed, the operation proceeds to step S120.

In step S120, a decision is made as to whether or not the washer switch 5 has been turned off by the driver. If it is decided that the washer switch 5 is sustained in an ON state, the wiper drive motor 3 is continuously driven to rotate at a high speed. If, on the other hand, it is decided that the washer switch 5 has been turned off, the operation proceeds to step S130. In step S130, the washer drive motor 2 is stopped before the operation proceeds to step S140.

In step S140, processing identical to the decision processing executed in step S90 is executed to determine whether or not the wiper blades (not shown) have been made to move the predetermined number of times after the washer drive motor 2 was stopped. If it is decided that the wiper blades have not yet moved three times, i.e., the predetermined number of times, they continue moving until they have moved the predetermined number of times. If, on the other hand, it is decided that the wiper blades have moved three times after the washer drive motor 2 was stopped, the operation proceeds to step S150.

In step S150, the wiper drive motor 3 is stopped based upon the stop position signal output from the wiper drive motor 3 and then the operation proceeds to step S170. In step S170, the timer 4*d* having been started in step S20 is reset and the wiper control processing ends.

As described above, when driving the wiper drive motor 3 by interlocking with an ON operation of the washer switch 5 performed by the driver, the wiper control apparatus achieved in the first embodiment starts the wiper drive motor 3 to rotate at a high speed if the vehicle is traveling at a speed equal to or higher than the predetermined speed. As a result, the washer fluid sprayed onto the windshield is quickly wiped away to ensure good visibility when the vehicle is traveling at a high speed.

Second Embodiment

The structure of the wiper control apparatus in the second embodiment is identical to that of the wiper control apparatus in the first embodiment shown in FIG. 1. The wiper control apparatus in the second embodiment differs from the wiper control apparatus in the first embodiment in the contents of the processing executed by the control device 4.

Figure 4:
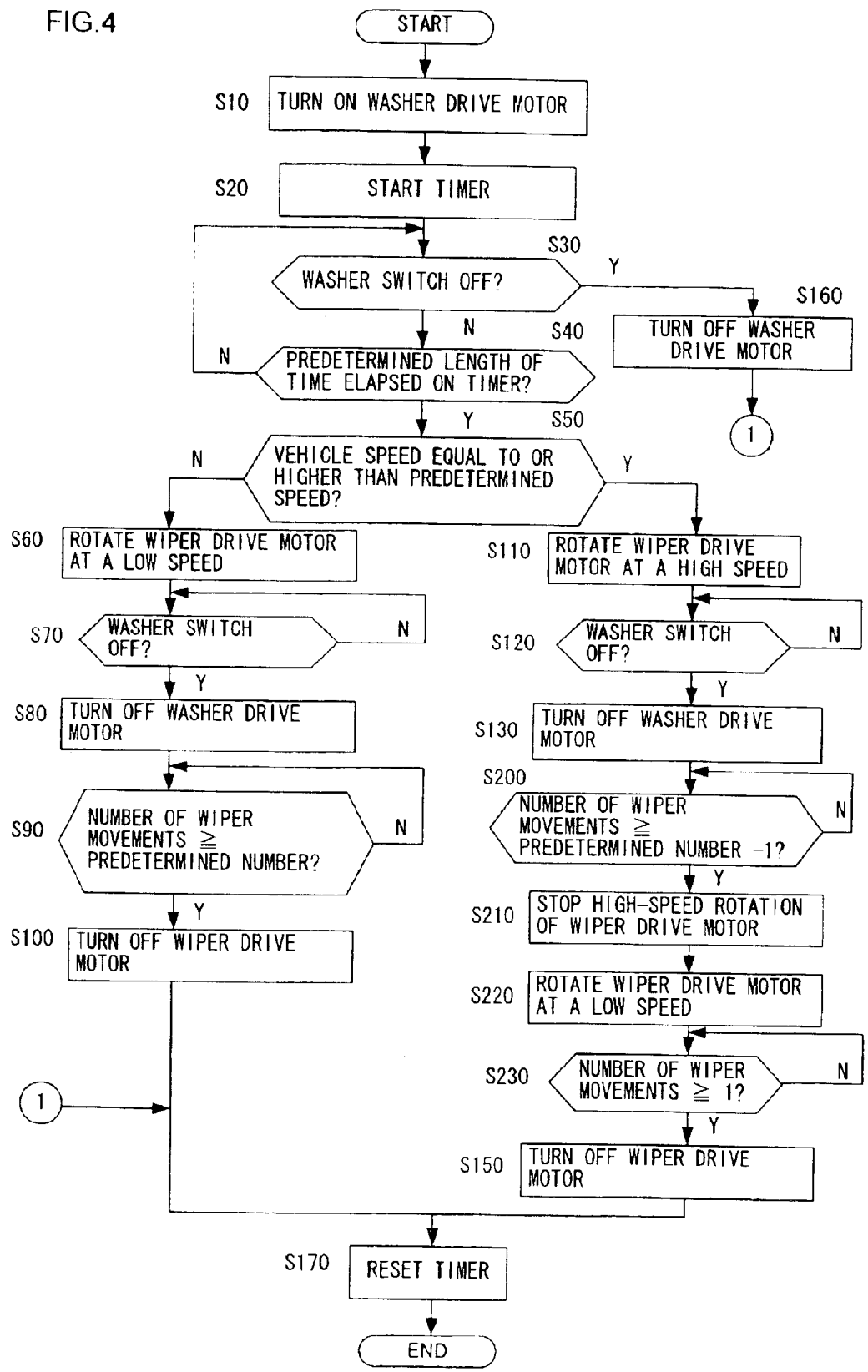
FIG. 4 presents a flowchart of the wiper control executed by the wiper control apparatus in a second embodiment.

FIG. 4 presents a flowchart of the wiper control executed by the wiper control apparatus in the second embodiment. The same step numbers are assigned to steps in which processing identical to that executed by the wiper control apparatus in the first embodiment, as shown in FIG. 3, is executed to preclude the necessity for a detailed explanation thereof.

As the washer switch 5 is turned on by the driver, the processing in step S10 starts. The processing executed from step S10 through step S100 is identical to that executed in step S10 through step S100 in the flowchart presented in FIG. 3. Namely, the processing executed after a decision is made in step S50 that the vehicle speed detected by the speed sensor 1 is lower than the predetermined speed is identical to that executed by the wiper control apparatus in the first embodiment. Accordingly, the following explanation focuses on the sequence of the processing starting in step S110, to which the operation proceeds after the vehicle is determined to be traveling at a speed equal to or higher than the predetermined speed.

In step S110, the wiper drive motor 3 is activated to rotate at a high speed. After deciding in step S120 that the washer switch 5 has been turned off, the washer drive motor 2 is stopped in step S130. Once the washer drive motor 2 is stopped, the operation proceeds to step S200.

The wiper blades are made to move the predetermined number of times (=n) after the washer fluid spray ends so as to wipe away the washer fluid on the windshield as explained earlier. In step S200, a decision is made as to whether or not the wiper blades have moved (n−1) times after the washer drive motor 2 was stopped. In other words, if n=3, a decision is made as to whether or not the wiper blades have moved twice after stopping the washer drive motor 2. If it is decided that the wiper blades have not yet moved twice, they are made to continue moving until they have moved twice, whereas if it is decided that the wiper blades have moved twice, the operation proceeds to step S210.

In step S210, the high-speed rotation of the wiper drive motor 3 is stopped and then the operation proceeds to step S220. In step S220, the wiper drive motor 3 is activated to rotate at a low speed. Namely, in steps S210 and S220, processing for switching the rotating speed of the wiper drive motor 3 from high to low is executed.

In step S230 executed after step S220, a decision is made as to whether or not the wiper blades have moved once after the rotating speed of the wiper drive motor 3 was switched to low. If it is decided that the wiper blades have been made to move once after starting the wiper drive motor 3 to rotate at a low speed, the operation proceeds to step S150. In step S150, the wiper drive motor 3 is stopped and then the operation proceeds to step S170. In step S170, the timer 4d is reset before the wiper control processing ends.

The wiper control apparatus in the second embodiment starts the wiper drive motor 3 to rotate at high-speed (step S110) if the vehicle speed is equal to or higher than the predetermined speed when driving the wiper drive motor 3 by interlocking with an ON operation of the washer switch 5 performed by the driver, as in the first embodiment. The washer drive motor 2 is stopped (step S120, step S130) in response to an OFF operation of the washer switch 5 performed by the driver, and the wiper blades (not shown) are made to move the predetermined number of times after the washer drive motor 2 stops (after the washer fluid spray ends). At this time, the wiper control apparatus implements control so that the one last movement of the movements made by the wiper blades over the predetermined number of times is made at low speed in the second embodiment. As a result, the wiper blades can be stopped at the stop position with a high degree of accuracy.

Namely, when the wiper drive motor 3 has been rotating at a high speed, there is a likelihood of the wiper blade stop position becoming offset even if the wiper drive motor 3 is stopped after verifying that the wiper blades have returned to the stop position based upon the stop position signal. In other words, the wiper blades may stop at a position slightly higher than the stop position instead of stopping exactly at the stop position (at the bottom end of the windshield) due to the inertial force of the motor rotation. Accordingly, the one last movement of the wiper blades is made at a low speed when moving the wiper blades the predetermined number of times following the washer fluid spray end to prevent the wiper blades stop position from becoming offset from the predetermined stop position.

The above described embodiments are examples, and various modifications can be made without departing from the spirit and scope of the invention. For instance, while the front wiper control is explained above, rear wipers used to wipe away raindrops and the like on the rear glass can be controlled by using the wiper control apparatus achieved in the first or second embodiment.

In addition, in the explanation given above, the wiper drive motor 3 is continuously driven to rotate at a low speed until the washer switch 5 is turned off if the vehicle speed is determined to be lower than the predetermined speed, whereas the wiper drive motor 3 is continuously driven to rotate at a high speed if the vehicle speed is determined to be equal to or higher than the predetermined speed. However, the rotating speed of the wiper drive motor 3 may be constantly adjusted in correspondence to the vehicle speed instead. For instance, if the vehicle speed is raised to a level equal to or higher than the predetermined speed while the washer switch 5 is in an ON state and the wiper drive motor 3 is rotating at a low speed, the wiper drive motor 3 may be driven to rotate at a high speed.

Namely, the vehicle speed and the predetermined speed may be compared with each other and the rotating speed of the wiper drive motor 3 may be adjusted based upon the results of the comparison at all times while the washer switch 5 is in an ON state. In such a case, hysteresis may be created for the predetermined speed which is compared with the vehicle speed detected by the speed sensor 1 to prevent the rotating speed of the wiper drive motor 3 from being switched too frequently.

When the wiper drive motor 3 is driven to rotate at a high speed (step S110), the wiper control apparatus in the second embodiment stops the washer drive motor 2 (step S130) in response to an OFF operation of the washer switch 5 and then causes the wiper blades to make the one last movement of the predetermined number of movements that the wiper blades are caused to make at a low speed (step S200 to step S230) However, all the movements of the wiper blades made over the predetermined number of times after stopping the washer drive motor 2 may be made at a low speed, instead.

Furthermore, while the predetermined speed compared against the vehicle speed is set to 80 km/h and the predetermined number of times the wiper blades are made to move after stopping the washer drive motor 2 is set to 3, the present invention may be adopted in conjunction with values other than these. It is to be noted that the wiper control apparatus according to the present invention may be adopted in all types of vehicles in which wipers are installed including two-wheel vehicles and electric trains as well as four-wheel vehicles having wipers installed therein.

The disclosure of the following priority application is herein incorporated by reference: Japanese Patent Application No. 2003-036776 filed Feb. 14, 2003.

What is claimed is:

1. A wiper control apparatus comprising:
    a wiper drive device that drives wiper blades used to wipe a glass surface at one of a low speed and a high speed;
    a vehicle speed detection device that detects a vehicle speed;
    a judging device that judges as to whether or not the vehicle speed detected by the vehicle speed detection device is equal to or higher than a predetermined speed; and
    a control device responsive to a manual turning on of a washer switch to spray a washer fluid and a determination by the judging device that the vehicle speed is equal to or higher than the predetermined speed to cause the wiper device to engage the wiper blades in a high-speed operation.

2. A wiper control apparatus according to claim 1, wherein:
    when the washer switch is manually turned on and the judging device determines that the vehicle speed is lower than the predetermined speed, the wiper drive device engages the wiper blades in a low-speed operation.

3. A wiper control apparatus according to claim 1, wherein:
    when the wiper blades are driven to make a predetermined number of movements after the washer switch having been in an ON state is manually turned off, the wiper drive device drives the wiper blades so as to make at least one last movement of the predetermined number of movements at a low speed.

4. A wiper control apparatus according to claim 1, wherein:
    the wiper drive device includes a wiper drive motor and a motor control device that controls the wiper drive motor; and
    the motor control device rotates the wiper drive motor at a high speed to drive the wiper blades at a high speed.

5. A wiper control apparatus comprising:
    a wiper drive means for driving wiper blades used to wipe a glass surface at one of a low speed and a high speed;
    a vehicle speed detection means for detecting a vehicle speed; and
    a judging means for judging as to whether or not the vehicle speed detected by the vehicle speed detection means is equal to or higher than a predetermined speed, wherein:
    the wiper drive means engages the wiper blades in a high-speed operation when a washer switch is manually turned on to spray a washer fluid and the judging means judges that the vehicle speed is equal to or higher than the predetermined speed.

6. A wiper control method for driving wiper blades used to wipe a glass surface at one of a low speed and a high-speed, wherein:
    the wiper blades are automatically engaged in a high-speed operation upon a washer switch being manually turned on to spray washer fluid if the vehicle speed is equal to or higher than a predetermined speed.

* * * * *